Sept. 2, 1969  H. W. STEPHENSON  3,464,213
BUOYANT FENDERS
Filed Nov. 27, 1967  6 Sheets-Sheet 1
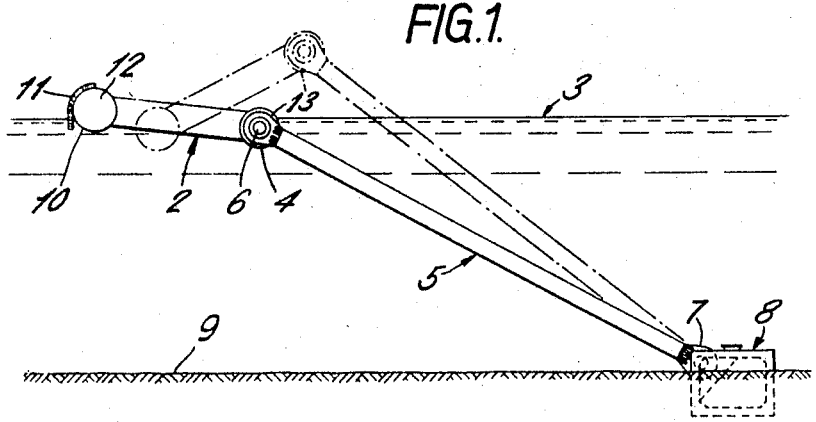
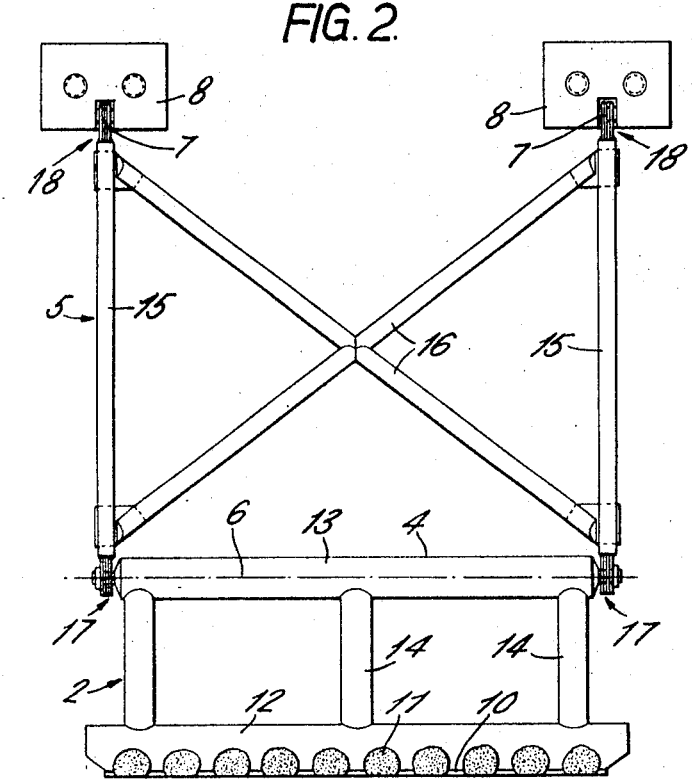
INVENTOR
HENRY WALTER STEPHENSON
BY
Bacon & Thomas
ATTORNEYS INVENTOR
HENRY WALTER STEPHENSON
BY
Bacon & Thomas
ATTORNEYS INVENTOR
HENRY WALTER STEPHENSON
BY
Bacon & Thomas
ATTORNEYS Sept. 2, 1969  H. W. STEPHENSON  3,464,213
BUOYANT FENDERS Filed Nov. 27, 1967  6 Sheets-Sheet 5

INVENTOR
HENRY WALTER STEPHENSON
BY
Bacon & Thomas
ATTORNEYS

Sept. 2, 1969    H. W. STEPHENSON    3,464,213
BUOYANT FENDERS
Filed Nov. 27, 1967    6 Sheets-Sheet 6

INVENTOR
HENRY WALTER STEPHENSON
BY
Bacon & Thomas
ATTORNEYS

United States Patent Office 3,464,213
Patented Sept. 2, 1969

3,464,213
BUOYANT FENDERS
Henry W. Stephenson, Kingsdown Old Rectory, near
Milstead, Sittingbourne, Kent, England
Filed Nov. 27, 1967, Ser. No. 685,795
Claims priority, application Great Britain, Nov. 29, 1966,
53,276/66
Int. Cl. B63b *43/18*
U.S. Cl. 61—46          11 Claims

ABSTRACT OF THE DISCLOSURE

A generally rectangular buoyant framework having spaced parallel buoyant elements one of which is just buoyant and the other of which is highly buoyant. The framework is pivoted to a pivotally anchored means arranged so that impact forces on the free edge of the framework and reaction from the anchored means causes the framework to tilt and shift its center of buoyancy in a manner to set up a restoring couple by its buoyancy and weight.

---

This invention relates to fenders for use in water, for example, for the prevention of damage caused by the impact of floating objects such as ships when they come into contact with relatively fixed objects such as quays, wharves, jetties or pontoons.

The problem of providing a fender to absorb the energy of a moving ship when its berths has become more serious as ships (particularly oil tankers) are built of increasing size. The energy of a ship of 300,000 tons deadweight moving even quite slowly against a quay is very considerable and considerable damage can be caused.

Conventional fenders for small ships have been formed of rubber, and for large ships steel piles have been used which deflect upon impact. In both cases the energy of the impact is absorbed elastically. It has been found that rubber is quite inadequate for very large ships and steel piling is very expensive.

The object of the present invention is to provide a fender capable of absorbing large amounts of energy which is nevertheless cheap and simple both to make and install.

According to one aspect of the present invention I provide a fender consisting of a framework which is floatable in water in a generally horizontal attitude connected at one end (the aft end) to one end of another framework so as to form an axis of articulation between the two frameworks the end of the other framework remote from the axis of articulation being connectible, in use, to an anchorage with said other framework inclined to the horizontal, the end of said floatable framework remote from the axis of articulation (the forward end) serving to receive the impact of, for example, a ship so that a force will be transmitted to the anchorage via the other framework and the floatable framework, and the floatable framework will be rotated and one end thereof will be at least partly lifted and the other end will be at least partly submerged, the floatable framework being such that as it is rotated under impact its centre of buoyancy moves horizontally away from its centre of gravity with the result that the buoyancy and gravity forces acting on the floatable framework tend to return it to its generally horizontal attitude.

The floatable framework is always subjected to an upthrust equal to the weight of water displaced acting vertically upwardly through the centre of buoyancy ("centre of buoyancy" is a well known term of hydrostatics and is defined as the centre of gravity that the volume of water displaced by the floatable framework would have had before displacement). Before impact, the force acting upwardly through the centre of buoyancy, and the weight of the floatable framework acting downwardly through the centre of gravity, and the reaction from the other framework acting through the axis of articulation are in equilibrium (if there was no reaction from the other framework the centre of buoyancy and the centre of gravy would be in a vertical line). When the floatable framework is rotated, after impact, the centre of buoyancy moves towards the side that is submerged and away from the centre of gravity and the force acting downwardly through the centre of gravity and the force atcing upwardly through the centre of buoyancy thus form a couple known as the "righting couple," tending to return the floatable framework to the horizontal position. Upon impact therefore, energy is absorbed in rotating the floatable member against the "righting couple."

Although fenders which absorb energy by rotating a floatable member against the righting couple have been proposed in British patent specifications 990,599 and 1,080,413 the present invention has the advantage that no piles are required for locating the fenders. The other framework which is articulated to the floatable framework holds the floatable framework in position, and also serves to impart a rotating movement to the floatable framework when the forward end of the floatable framework receives an impact from a ship. Since there need be no fixed piles it is possible for the floatable framework to be rotated into the vertical position and for the fender still to continue to absorb energy if, in exceptional circumstances, the ship is still moving. This is an important advantage.

The anchorage of the other framework may be above water if a suitable abutment, such as a quay is available, in which case it will be the aft end of the floatable framework that is at least partly submerged upon impact. Such an arrangement can be anchored to a floating object, such as a ship or pontoon, and can for example be used where two ships are to be moored alongside one another.

The anchorage of the other framework may be under water and therefore, according to another aspect of the present invention I provide a fender consisting of a framework which is floatable in water in a generally horizontal attitude connected at one end (the aft end) to one end of another framework so as to form an axis of articulation between the two frameworks, the end of the other framework remote from the axis of articulation being connectible, in use, to an anchorage under water so that the other framework is inclined to the horizontal, the end of said floatable framework remote from the axis of articulation (the forward end) serving to receive the impact of, for example, a ship so that a force will be transmitted to the anchorage via the other framework and the floatable framework, and the floatable framework will be rotated and the aft end thereof will be lifted relative to the surface of the water, the floatable framework being such that as it is rotated under impact its centre of buoyancy moves horizontally away from its centre of gravity and towards the forward end with the result that the buoyancy and gravity forces acting on the floatable framework tend to return it to its generally horizontal attitude.

Preferably the floatable framework is formed of buoyant tubes extending along the forward and aft ends, the tubes being interconnected by cross members. Preferably the centre of gravity of the floatable framework is closer to the end that is lifted upon impact than to the other end and preferably is as close as possible to the end that is lifted. Where there are buoyant tubes along the forward and aft ends, the buoyant tube that is lifted upon impact may be weighted so as to be only just buoyant. Preferably the other end is as buoyant as possible. In this way a large righting couple is obtained, so that large energies can be absorbed.

The other framework, when connected to its anchorage, is preferably inclined to the horizontal at as small an angle as practicable so that the movement of the aft end of the floatable framework has a large vertical component of motion. The other framework is therefore preferably longer than the floatable framework in the direction perpendicular to the axis of articulation.

Preferably there are means for restraining lateral movement of the floatable framework i.e. in the direction of the axis of articulation so as to resist the force that would occur if a ship strikes the fender when it has a component of movement in the direction of the axis of articulation.

In order that the invention may be well understood various embodiments of fenders according to the invention will now be described by way of example with reference to the accompany drawings in which:

FIG. 1 is a side view of one embodiment in water,
FIG. 2 is a top plan view of the embodiment of FIG. 1,
FIG. 3 is a graph showing energy and resistance versus deflection curves for the embodiment of FIG. 1,
FIGS. 4–7 show top plan views of four embodiments of the invention which differ from the embodiments of FIGS. 1 and 2 in the construction of one of the frameworks,
FIG. 8 shows diagrammatically the manner of anchoring the embodiment of FIG. 7,
FIG. 9 is a side view of another embodiment of the invention in water,
FIG. 10 is a plan view partly in section of a bearing,
FIG. 11 is a cross sectional side view of the bearing of FIG. 10,
FIG. 12 is a plan view partly in section of another bearing,
FIG. 13 is a side view partly in section of the bearing of FIG. 13,
FIG. 14 is a side view partly in section of the bearing for an anchorage for a fender,
FIG. 15 is a cross section of the bearing of FIG. 14,
FIG. 16 is a side view of the bearing of FIG. 14, with the fender deflected, and
FIG. 17 is a side view partly in section of another bearing.

The fender shown in FIGS. 1 and 2 consists of one framework 2, which is seen floating on the surface of the water 3 in a generally horizontal attitude connected at its aft end 4 to one end of another framework 5 so as to form an axis of articulation 6 between the two frameworks 2, 5. The end 7 of the framework 5 remote from the axis of articulation 6 is shown connected to anchor blocks 8 fixed under water to the sea bed 9 so that the framework 5 is inclined to the horizontal. The forward end 10 of the floating framework serves to receive the impact of a ship and is provided with local fendering 11 formed of any suitable material such as hemp, wood or rubber.

The two frameworks 2, 5 are formed of tubular members. The framework 2 has a tube 12 at the forward end 10 having an outer diameter of 3.2 metres and a tube 13 at the aft end 4 having an outer diameter of 2.896 metres. The length of the forward end 10 of the tube 12 is 36.576 metres. The tubes 12, 13 are interconnected by three tubular cross members 14.

The framework 5 has two side tubes 15 with tubular diagonal members 16 to give lateral strength. The framework 5 is 36.576 meters long (in the direction perpendicular to the axis 6) i.e. much longer than the framework 2 which is 12.192 meters long. With a depth of water of 18 meters the framework 5 will therefore make quite a small angle to the water surface 3.

The aft tube 13 is ballasted with added weight for instance by adding concrete, or extra metal, so that it is only just buoyant and so that the centre of gravity of the framework 2 is as near the aft end as possible. The forward tube 12 as a large diameter and is consequently very buoyant.

When the forward end 10 receives an impact from a ship, a compressive force is transmitted through the frameworks 2 and 5 to the anchor blocks 8. As a result of the reactions between the frameworks 2 and 5 the framework 2 is rotated and the weighted tube 13 will be lifted (as shown in dotted lines in FIG. 1). The buoyant tube 12 will be at least partly submerged and the centre of buoyancy (through which the resultant upthrust acts) will move towards the forward end 10. The righting couple formed by the upthrust acting through the centre of buoyancy and the weight of the framework acting through the centre of gravity will tend to return the framework 2 to the horizontal position. The energy of the ship moving against the fender is therefore absorbed in rotating the framework against the righting couple. The greater the movement of the ship the more energy is absorbed.

FIG. 3 shows the massive energies that are absorbed as the fender of FIGS. 1 and 2 is deflected. This fender is therefore capable of absorbing the energies of ships of even the largest sizes that have been proposed. It will be seen that even if, in exceptional circumstances, the ship is still moving when the framework 2 has been rotated to a vertical position, the fender can continue to be displaced and will continue to absorb energy, since the framework 2 will simply be lifted out of the water. It will be seen that the fender can deflect considerably more than conventional fenders. It is also an advantage that the fender does not exert too great a resisting force at any one point to the side of the ship which might damage the ship.

The framework 2 is articulated to the framework 5, by means of bearings 17 and the framework 5 is connected to anchor blocks 8 by means of bearings 18 which will be described in more detail below.

The framework 2 is retained in position solely by means of the framework 5 and apart from the framework 5 nothing restrains vertical movement of the tube 13. The tube 12 is quite free for vertical movement.

FIG. 4 shows an arrangement similar to that shown in FIGS. 1 and 2 except that the framework 5 is arranged to permit some vertical movement of one side of the framework 5 with respect to its other side due to the action of waves. The framework 5 is here formed in two parts 19 and 20 separately connected to the sides of the framework 2 by bearings 21. The part 20 has a diagonal member 22 to resist lateral forces i.e. in the direction of the axis 6. The parts 19 and 20 have separate bearings 23, 24 both connected to one of the anchor blocks 8. The bearings 21 and 23 allow a certain freedom of rotation in addition to rotation about their normal axis.

FIG. 5 shows another arrangement for allowing twisting of the framework 5, including two chains 25 extending diagonally from corners of the framework. The chains 25 are connected together at their mid points and serve to take the lateral forces.

Figure 3:
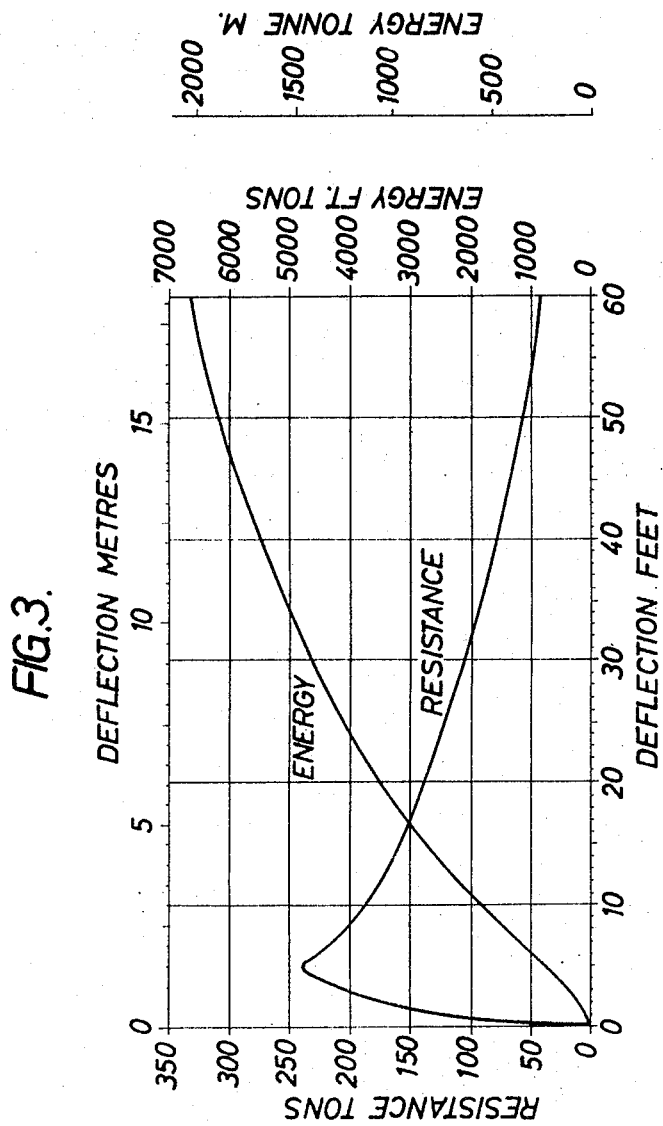
Figure 4:
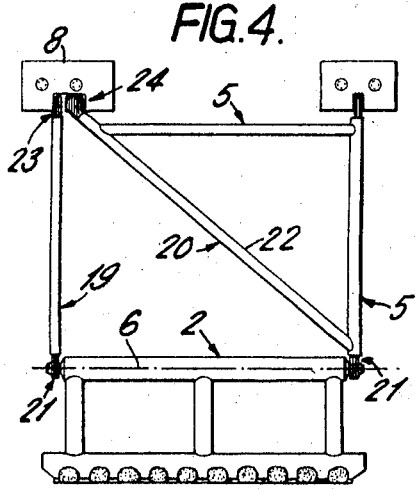
Figure 5:
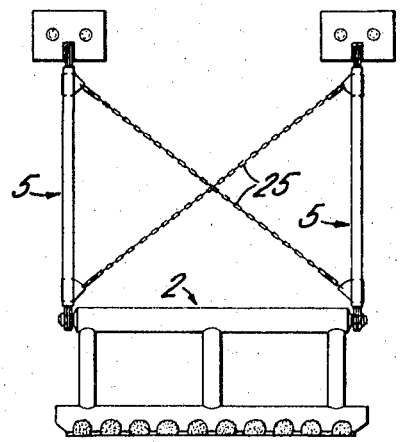
Figure 6:
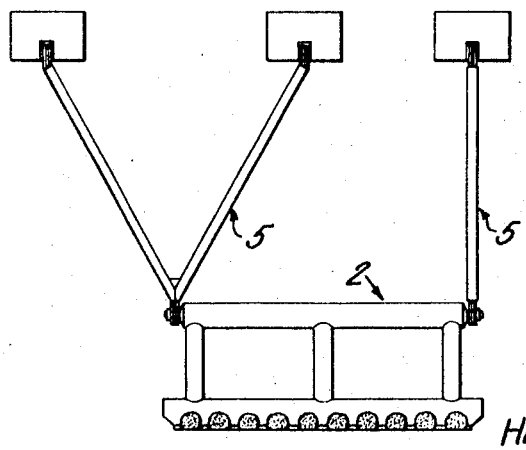
FIG. 6 shows another arrangement for allowing twisting of framework 5 in which the framework 5 is formed in two parts.
Figure 7:
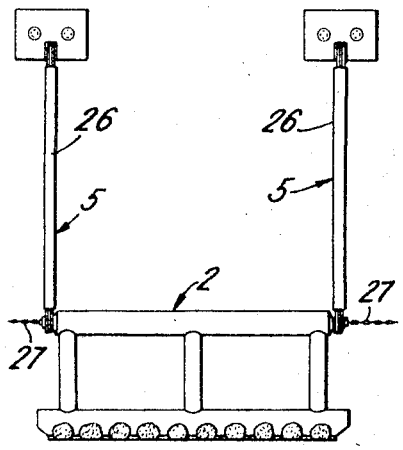
FIG. 7 shows an arrangement in which the framework consists of two independent members 26, resistance against lateral movement being provided by chains 27 anchored as shown in FIG. 8.
Figure 8:
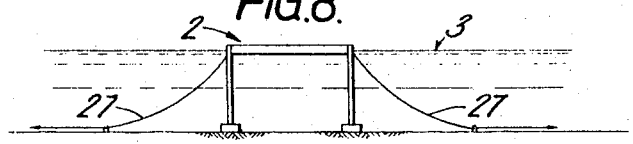
Figure 9:
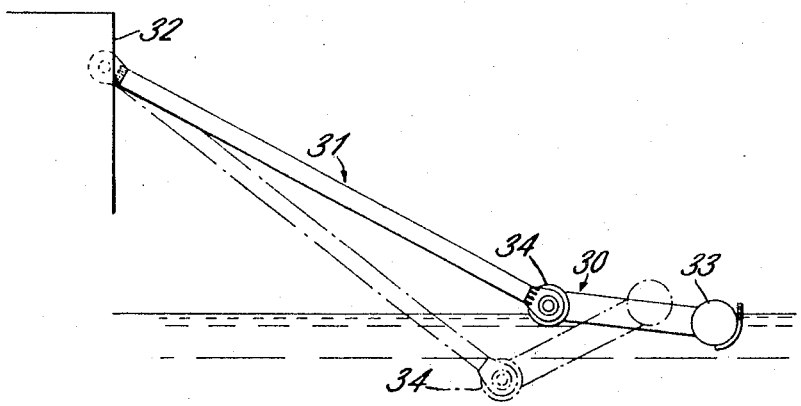

FIG. 9 shows a side view of another embodiment of the invention having a floating framework 30 connected to another framework 31 the aft end of which is connected to an abutment 32 above the water level. In this embodiment the forward tube 33 of the framework 30 is weighted and the aft tube 34 is very buoyant and is submerged upon impact as is shown in dotted lines. In other respects this embodiment is similar to that of FIGS. 1 and 2. This embodiment has the advantage that it could be connected to the side of a ship (instead of to a quay) and need only be lowered into the water when the ship comes alongside to a quay or to another ship.

Figure 10:
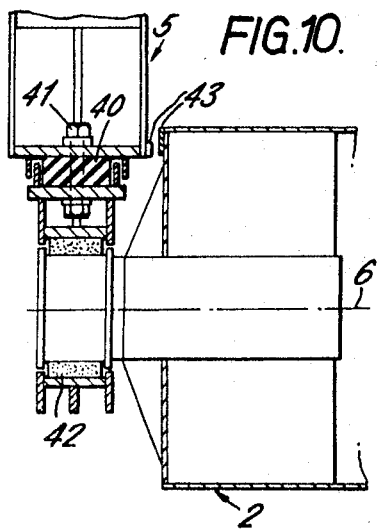
Figure 11:
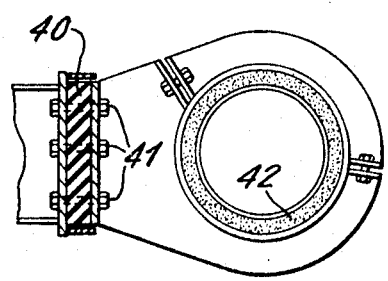

FIGS. 10 and 11 show a form of bearing for use between the two frameworks 2 and 5, which allows some freedom of movement in addition to rotation about the normal axis 6. The part of the bearing carried by the framework 5 has a rubber packed joint 40 maintained in compression by bolts 41. The principal bearing material 42 may be of any suitable material such as lignum vitae, Teflon or Tufnol (registered trademarks). The rubber 40 can be compressed and so allows freedom of movement about the two axes at right angles to axis 6.

Under blows at right angles to the floating framework 2 the thrust is transmitted through the principal bearing material 42 to the framework 5. Under a blow inclined to the framework 2 the rubber 40 deforms the steel bearing pads 43 transmit the thrust from framework 2 to framework 5.

Figure 13:
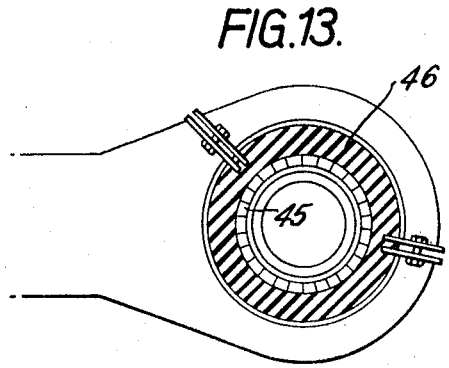
Figure 12:
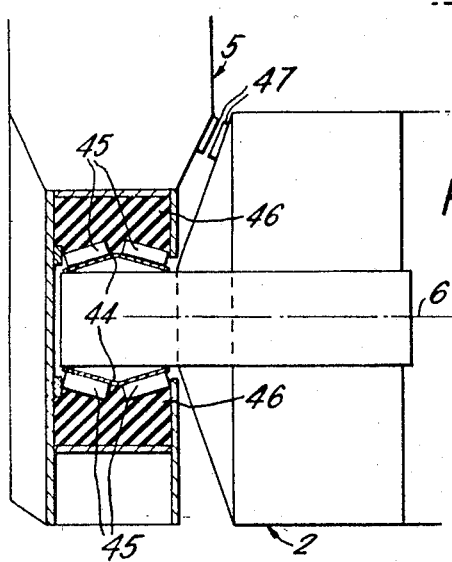

FIGS. 12 and 13 show an alternative form of bearing to that shown in FIGS. 10 and 11. The framework 2 carries a seating 44 which approximates to a spherical surface. The principal bearing materials 45 are backed by rubber blocks 46. Steel pads 47 resist forces parallel to the axis 6.

Figure 14:
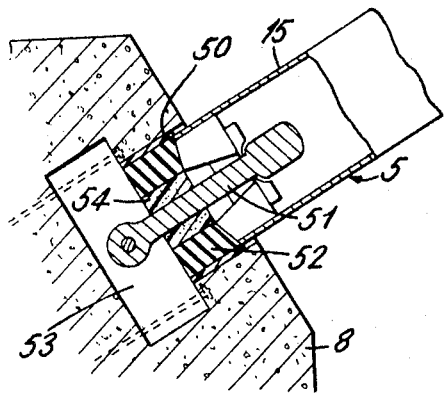
Figure 15:
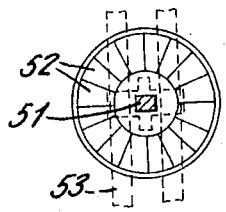
Figure 16:
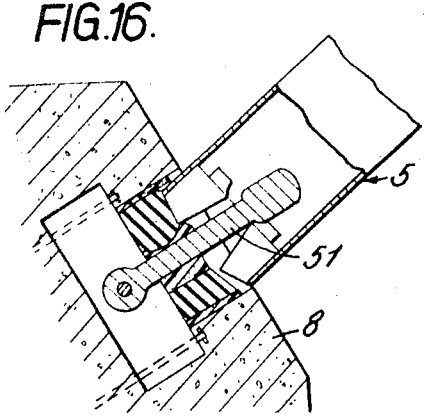

FIGS. 14, 15 and 16 show a bearing for connecting the framework 5 to an anchor block 8. The tube 15 of framework 5 is held in a socket 50 by the link 51, which is pivoted to an anchorage 53. The socket 50 contains rubber sections 52 surrounding the link 51 and under compressive forces the rubber sections 52 transmit force to the anchorage 53. The rubber section 52 forms an annular ring surrounding the link 51. Foam plastic 54 fills the space between the link 51 and rubber 52 to allow deformation of the rubber. FIG. 16 shows compressive force being transmitted asymetrically as a result of deflection of the fender. Tensile forces are transmitted from the framework 5 to the anchorage via the link 51.

Figure 17:
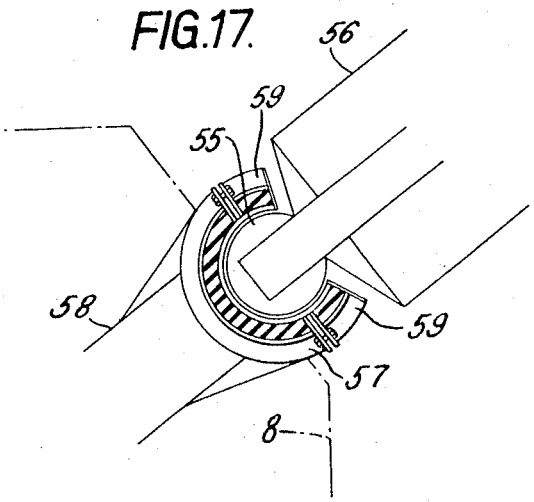

FIG. 17 shows a ball and socket joint permitting rotation about all three axes, and may be used at any point in a fender where rotation about more than one axis is required. The ball 55 is connected to the end of one member 56 to be articulated and the socket 57 is fixed to the other member 58 (or could be fixed to an anchor block 8 shown in dotted lines). The sections 59 of the socket 57 are removable to allow for installation and removal of the member 56.

I claim:
1. A fender comprising a first framework which is floatable in water in a generally horizontal attitude and comprises two substantially parallel buoyant elements, one of which is ballasted to be less buoyant than the other, a second framework having means at one end making articulated connection to one end of the first framework along an axis, and means at its other end making pivotal connection with an anchorage, said second framework extending oblique to the horizontal, the end of said floatable framework remote from the axis of articulation serving to receive the impact of for example a ship so that a force will be transmitted to the anchorage via the second framework and the floatable framework will be rotated and one end thereof will be at least partly lifted and the other end will be at least partly submerged, the buoyancy of said floatable framework being constant, and equal to its weight and such that the water line passes through a cross section of the buoyant element adjacent said remote end of the floatable framework such that as it is rotated under impact its center of buoyancy moves horizontally away from its center of gravity with the result that the buoyancy and gravity forces acting on the floatable framework tend to return it to its generally, horizontal attitude.

2. A fender as claimed in claim 1 in which the centre of gravity of the floatable framework is closer to the end that is lifted upon impact than to the other end.

3. A fender as claimed in claim 1 in which the said buoyant elements are buoyant tubes extending along the forward and aft ends, said tubes being interconnected by cross members.

4. A fender as claimed in claim 2 in which the ballasted element is the one that is lifted upon impact and is ballasted so as to be only just buoyant.

5. A fender as claimed in claim 1 including means for restraining lateral movement of the floatable framework i.e. in a direction along said axis of articulation.

6. A fender as claimed in claim 5 in which said second framework includes at least one rigid diagonal member extending from one side to the other to resist lateral movement.

7. A fender as claimed in claim 1 in which said other framework is arranged in use to allow some vertical movement of one side thereof with respect to the other side, the floatable framework being articulated to the second framework by bearings which allow some freedom of rotation about at least one axis perpendicular to said axis of articulation.

8. A fender as claimed in claim 11 in which the said other framework is formed in two parts each part being articulated to one side of the floatable framework.

9. A fender as claimed in claim 1 wherein the means at the other end of the second framework is connected to an anchorage above water so that the said one end of the floatable framework will in operation be caused at least partly to submerge upon impact and wherein the fully immersed buoyancy of the buoyant element adjacent the said one end of the floatable framework is less than the weight of the floatable framework.

10. A fender as claimed in claim 9 in which the second framework is anchored above water to a floating object.

11. A fender comprising a first framework which is floatable in water in a generally horizontal attitude and comprises two substantially parallel buoyant elements, said framework being connected at one end to one end of a second framework along an axis of articulation between the two frameworks, the buoyant element adjacent said axis being ballasted to be less buoyant than the other element, the end of the second framework remote from the axis of articulation being pivotally connected to an anchorage under water, the length of said second framework from said anchorage to the axis of articulation being greater than the vertical distance between the anchorage and the surface of the water so that the said second framework is inclined to the horizontal, the end of said floatable framework remote from the axis of articulation serving to receive the impact of, for example, a ship so that a force will be transmitted to the anchorage via the second framework and the floatable framework, and the floatable framework will be rotated and the end thereof adjacent said axis will be lifted relative to the surface of the water, the fully immersed buoyancy of the buoyant element at the end of said floatable framework remote from said axis being greater than the weight of the floatable framework such that as it is rotated under impact its center of buoyancy moves horizontally away from its center of gravity and towards the said remote end with the result that the buoyancy and gravity forces acting on the floatable framework tend to return it to its generally horizontal attitude.

References Cited
UNITED STATES PATENTS

| | | | |
|---|---|---|---|
| 2,120,545 | 6/1939 | Buckton | 61—48 X |
| 2,417,849 | 3/1947 | Walters et al. | 61—48 X |
| 3,340,694 | 9/1967 | Pavry et al. | 61—48 |

JACOB SHAPIRO, Primary Examiner

U.S. Cl. X.R.

61—48; 114—220